United States Patent [19]
Gentry et al.

[11] Patent Number: 5,758,089
[45] Date of Patent: May 26, 1998

[54] METHOD AND APPARATUS FOR BURST TRANSFERRING ATM PACKET HEADER AND DATA TO A HOST COMPUTER SYSTEM

[75] Inventors: Denny E. Gentry, Palo Alto; Rasoul M. Oskouy, Fremont, both of Calif.

[73] Assignee: Sun Microsystems, Inc., Mountain View, Calif.

[21] Appl. No.: 552,342

[22] Filed: Nov. 2, 1995

[51] Int. Cl.$^6$ .............. G06F 13/00; G06F 13/38; H04J 3/24

[52] U.S. Cl. .............. 395/200.64; 395/200.8; 370/473

[58] Field of Search .............. 395/200.13, 200.17, 395/200.2, 200.63, 200.64, 200.66, 200.8; 370/473, 474

[56] References Cited

U.S. PATENT DOCUMENTS

| | | |
|---|---|---|
| 5,241,541 | 8/1993 | Farrell et al. |
| 5,379,297 | 1/1995 | Glover et al. .............. 370/474 |
| 5,459,723 | 10/1995 | Thor . |
| 5,600,650 | 2/1997 | Oskouy .............. 395/200.2 |
| 5,604,867 | 2/1997 | Harwood .............. 395/200.13 |
| 5,625,625 | 4/1997 | Oskouy et al. .............. 370/474 |
| 5,633,870 | 5/1997 | Gaytan et al. .............. 395/200.2 |

OTHER PUBLICATIONS

LightStream White Paper; "Buffer Management For ATM Enterprise BAckbone Networks"; LightStream Corporation, Billerica MA 01821 USA, Jun. 1994.

Miller A.; "From here to ATM"; IEEE Spectrum Magazine; pp. 20–24, Jun. 1994.

*Primary Examiner*—Mark H. Rinehart
*Attorney, Agent, or Firm*—Blakely Sokoloff Taylor & Zafman

[57] ABSTRACT

A network interface circuit (NIC) is provided with logic for maintaining various control pointers and at least one control counter for controlling burst transferring of buffered ATM cells to its host computer system in a non-cellboundary-aligned block manner, distinguishing the ATM packet header from the ATM data most of the time, except for a number of predetermined exceptions. More specifically, ATM packet headers and ATM data are to be burst transferred to separate header and data buffers on the host computer system, except for short and atypical packets, in fixed size blocks, where the block size is complementary to the interface bus, but not necessarily aligned with the ATM cell boundaries. For the short and atypical packets, both the header and data are to be burst transferred into the header buffer instead. The logic employs a two phase approach to determining the appropriate updates to the relevant control pointers and at least one control counter after each burst transfer of header/data to the header/data buffer. In one embodiment, the logic is provided to the lookahead state machine of an unload block, which is part of the receive block of a system and ATM layer core of the NIC.

22 Claims, 10 Drawing Sheets

METHOD AND APPARATUS FOR BURST TRANSFERRING ATM PACKET HEADER AND DATA TO A HOST COMPUTER SYSTEM

BACKGROUND OF THE INVENTION

1. Field of the Invention

The present invention relates to the field of computer networking. More specifically, the present invention relates to the transfer of asynchronous transfer mode (ATM) packet header and ATM data from a network interface circuit (NIC) to its host computer system.

2. Background Information

In U.S. patent application, Ser. No. 08/473,514, the claimed subject matter of which was invented by the same inventors, and assigned to the same assignee as the present invention, a method and apparatus for reordering interleaved ATM cells is disclosed. Described in U.S. patent application Ser. No. 08/473,514, interleaved ATM cells of different channels received by a NIC are buffered in "buckets" linked together as multiple linked lists on a per channel basis. The NIC would burst transfer the buffered ATM cells for a channel to the host computer system after the number of accumulated ATM cells for the channel has reached a predetermined threshold. A number of data structures and a schedule queue are used to manage the buffering of the ATM cells, including the location of the free resources, and scheduling the transfers. A method for burst transferring the buffered ATM cells (without distinguishing packet header and data) in fixed size blocks, where the block size is complementary to the interface bus between the NIC and its host computer system, but not necessarily aligned with the ATM cell boundaries, was also disclosed. Under the disclosed method, a partial bucket pointer in conjunction with a partial offset are employed for each channel to manage the temporal existence of a partially unloaded ATM bucket from time to time in the course of unloading. The partial bucket pointer is used to identify the partially unloaded ATM bucket, whereas the partial offset is used to identify the starting location of the residual data within the partially unloaded ATM bucket.

It is further desirable to be able to distinguish the packet header and data most of the time, when burst transferring ATM cells in the above described block manner. More specifically, it is desirable to be able to burst transfer the ATM packet headers and the ATM data into different buffers on the host computer system, except for short packets and "atypical" packets, in the above described block manner. A short packet is a packet with only a few bytes of data following a relatively lengthy header, whereas an "atypical" packet is a packet smaller than the header size of the most common packet type for which the hardware is programmed to optimize[1]. For each of these packets, for performance reasons, both the packet header and data are to be burst transferred into the header buffer. As will be disclosed in more detail below, the present invention achieves these and other desired benefits.

[1] Applications employ these atypical packets for control purpose. For example, the most common packet type has a header length of 206 bytes, however a control packet has a header length of 36 bytes and data length of 4 bytes totalling to only 40 bytes.

SUMMARY OF THE INVENTION

A NIC is provided with logic for maintaining various control pointers and at least one control counter for controlling burst transferring of buffered ATM cells to its host computer system in a non-cell-boundary-aligned block manner, distinguishing the ATM packet header from the ATM data most of the time, except for a number of predetermined exceptions. More specifically, ATM packet headers and ATM data are to be burst transferred to separate header and data buffers on the host computer system, except for short and atypical packets, in fixed size blocks, where the block size is complementary to the interface bus, but not necessarily aligned with the ATM cell boundaries. For the short and atypical packets, both the header and data are to be burst transferred into the header buffer instead.

The relevant control pointers include the partial bucket pointer and the partial offset. Additionally, the relevant control pointers include a first bucket pointer pointing to the first full ATM bucket, which follows the partial bucket pointer, if the partial bucket exists, a next bucket pointer pointing to the ATM bucket immediately following the first ATM bucket, and a last bucket pointer pointing to the last linked ATM bucket. The relevant at least one control counter includes a remaining header length counter.

The logic employs a two phase approach to determining the appropriate updates to these relevant control pointers and at least one control counter after each burst transfer of header/data to the header/data buffer. The logic takes into account whether the NIC is burst transferring the header or burst transferring the data, and whether the NIC is about to transition from burst transferring the header to burst transferring the data, when determining the appropriate updates. Furthermore, the logic takes into account whether the packets are to be handled as exceptions, i.e. not distinguishing the data from the header.

In the first phase, the logic determines the new remaining header length, if the NIC is burst transferring the header, and the new "unnormalized" partial offset. In the second phase, the logic determines the new "normalized" partial offset, the new partial, first and next bucket pointers, depending on where the new "unnormalized" partial offset is pointing to. More specifically, the logic makes the above determinations depending on whether the new "unnormalized" partial offset is pointing to a position in the linked ATM buckets that is beyond the furthest full ATM cell that could have been burst in the just completed burst (hereinafter simply the "furthest full ATM bucket"), at the end of the "furthest full ATM bucket", beyond the ATM bucket where the just completed burst started (hereinafter simply the "starting ATM bucket") but before the end of the "furthest full ATM bucket", at the end of the "starting ATM bucket", or still within the "starting ATM bucket". For each of these cases, the logic further factors into consideration whether the EOP marking was among the header/data that was just burst transferred.

In one embodiment, the logic is provided to the lookahead state machine of an unload block, which is part of the receive block of a system and ATM layer core of the NIC.

BRIEF DESCRIPTION OF DRAWINGS

The present invention will be described by way of exemplary embodiments, but not limitations, illustrated in the accompanying drawings in which like references denotes similar elements, and in which.

3

Figure 4:
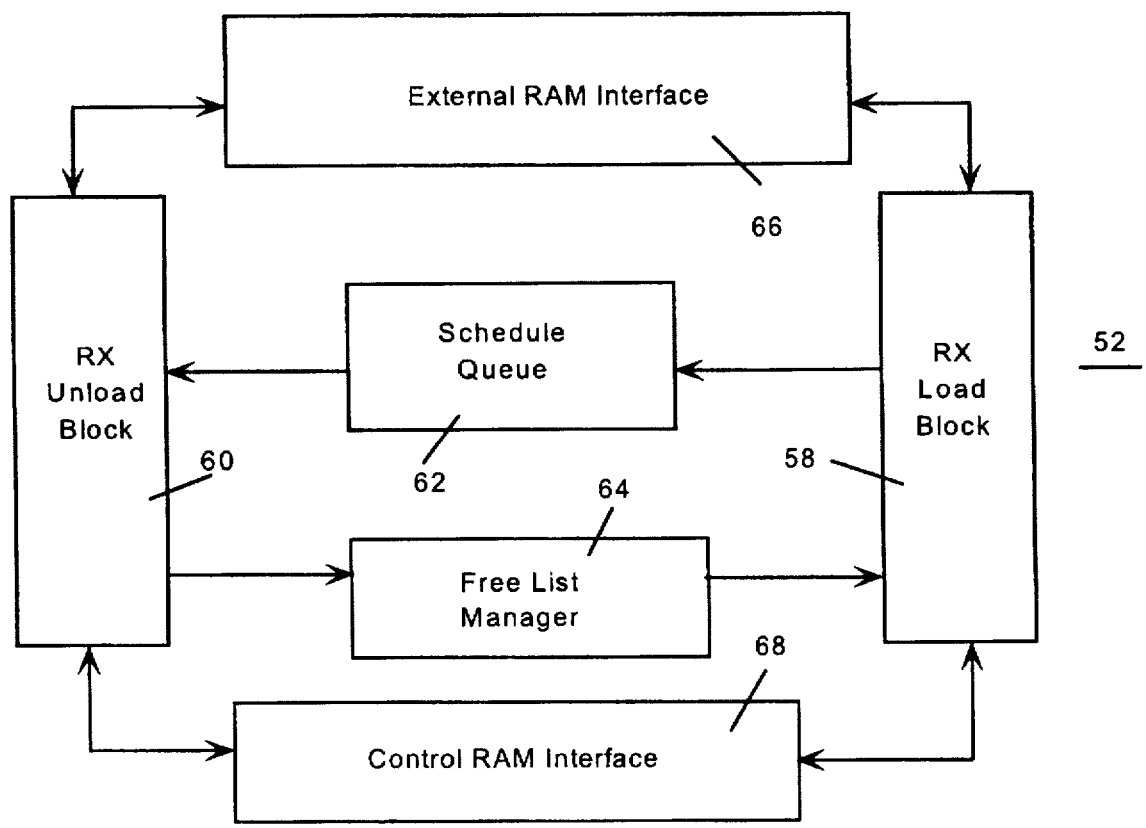
FIG. 4 illustrates the Receive Block of FIG. 3.
Figure 5:
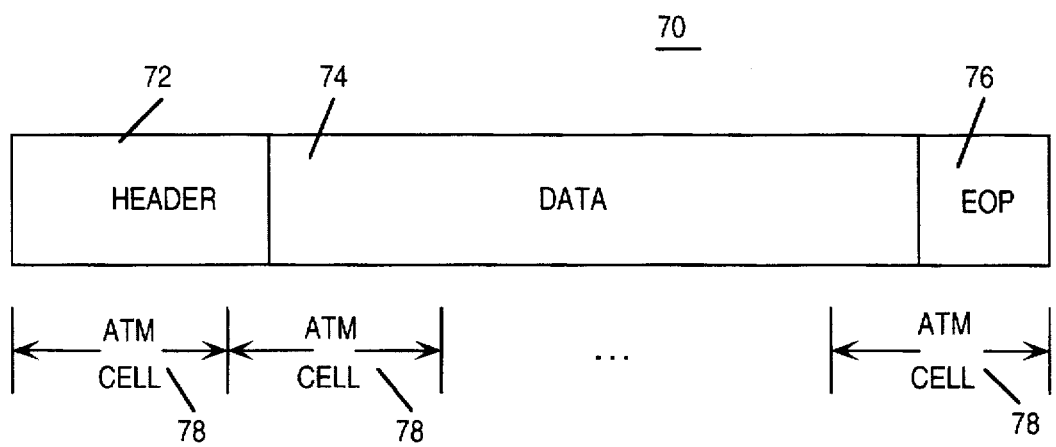
Figure 6:
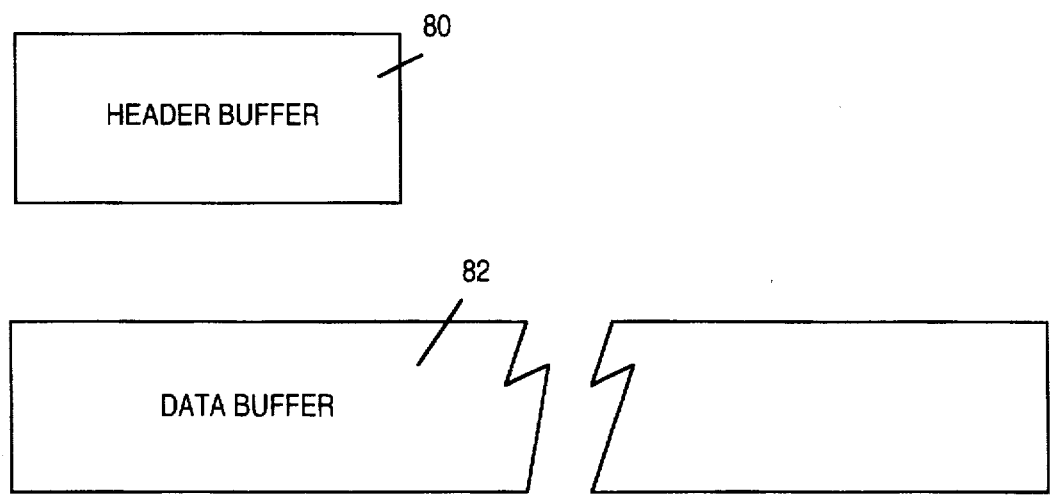
Figure 7:
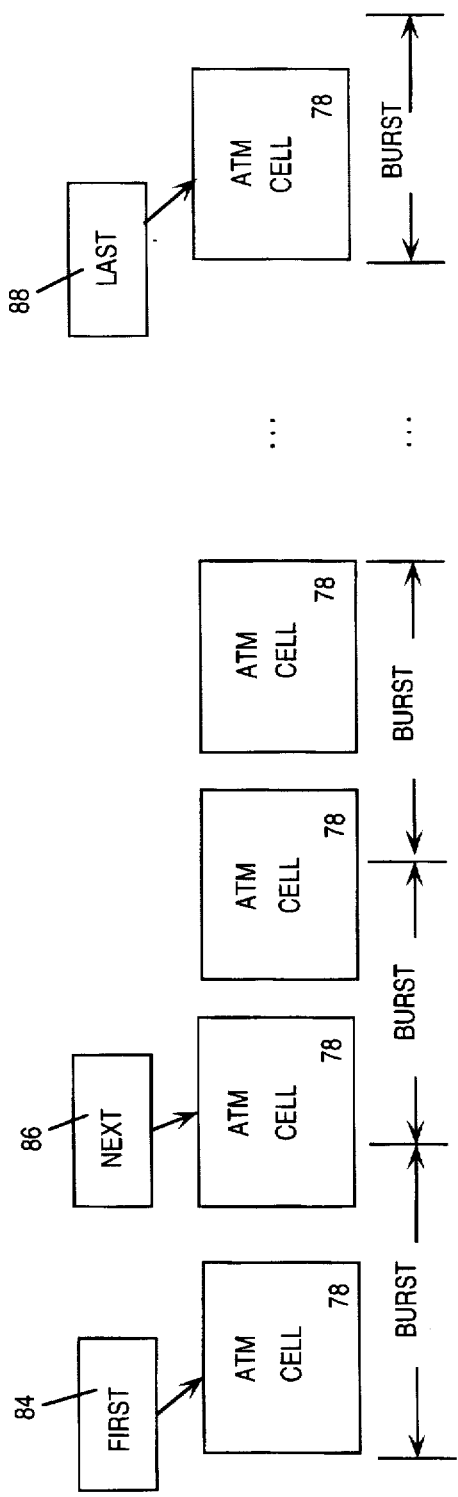
Figure 8:
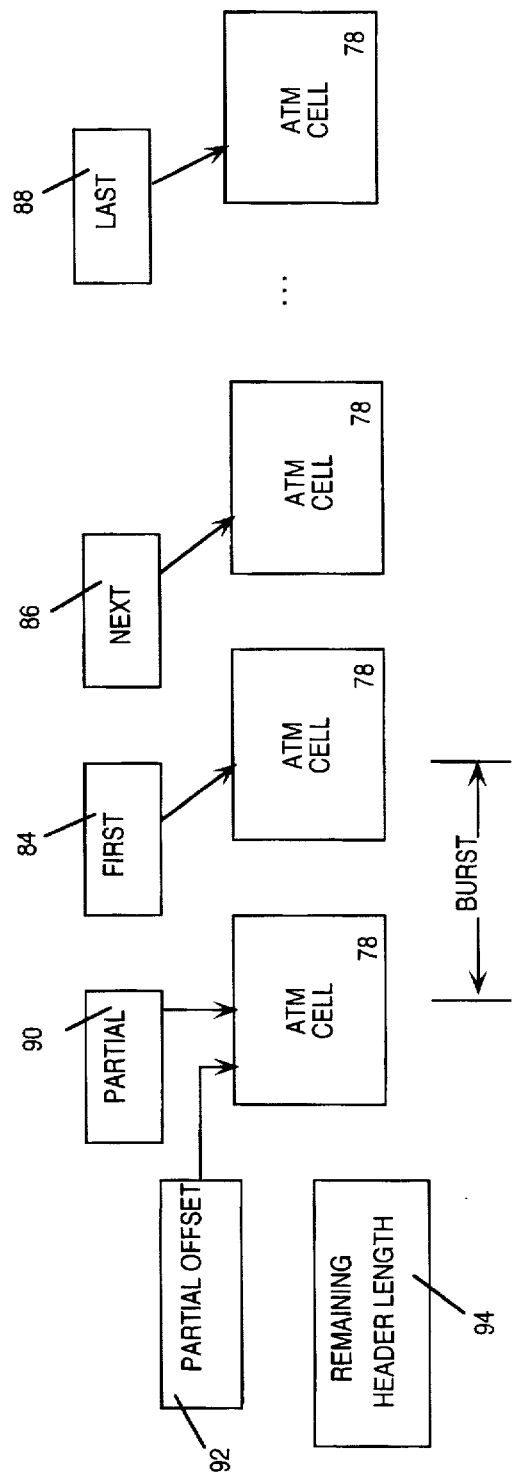
Figure 9:
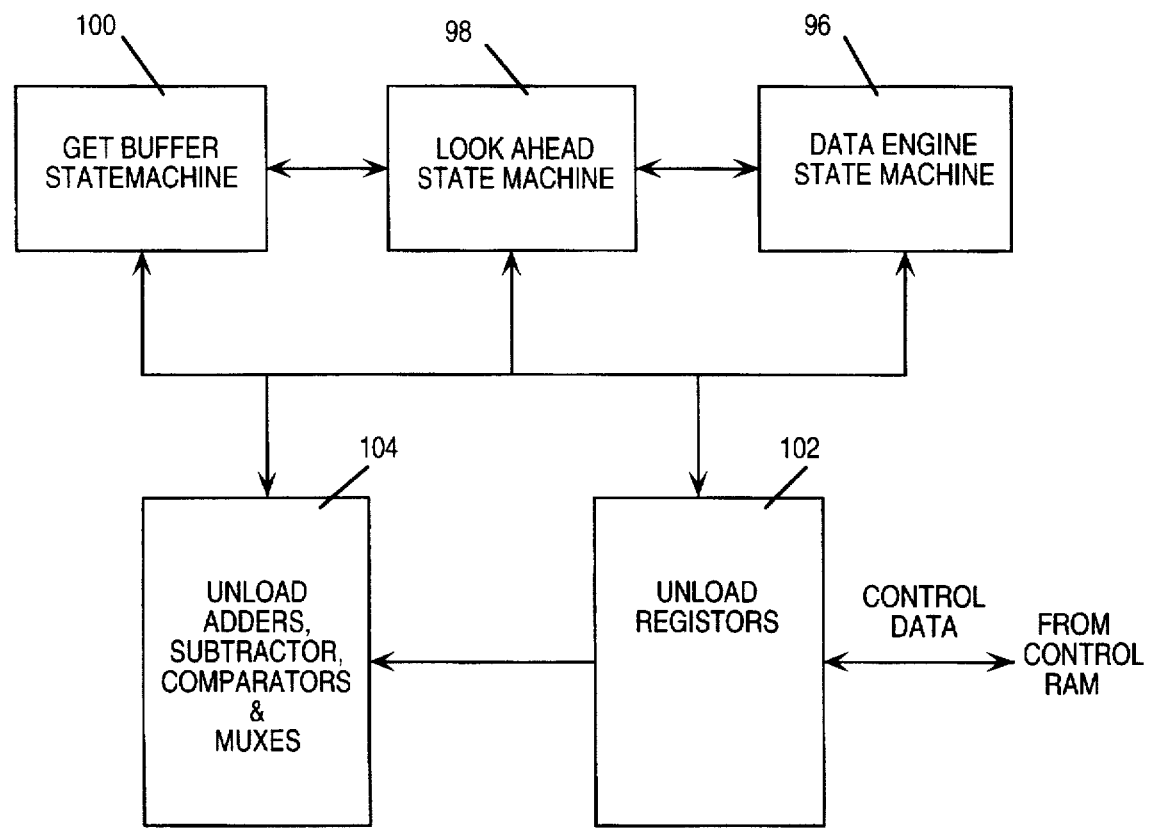

FIG. 5 illustrates an ATM packet;

FIG. 6 illustrates the header and data buffers on the host system;

FIGS. 7-8 illustrate the non-cell-boundary-aligned approach for burst transferring header data to the host system;

FIG. 9 illustrates one embodiment of the Unload Block of FIG. 4; and

FIG. 10a-10f illustrate one embodiment of the logic flow incorporated in the lookahead state machine of FIG. 9 for maintaining the relevant control pointers and counter(s) for burst transferring ATM header and data in the desired manner.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
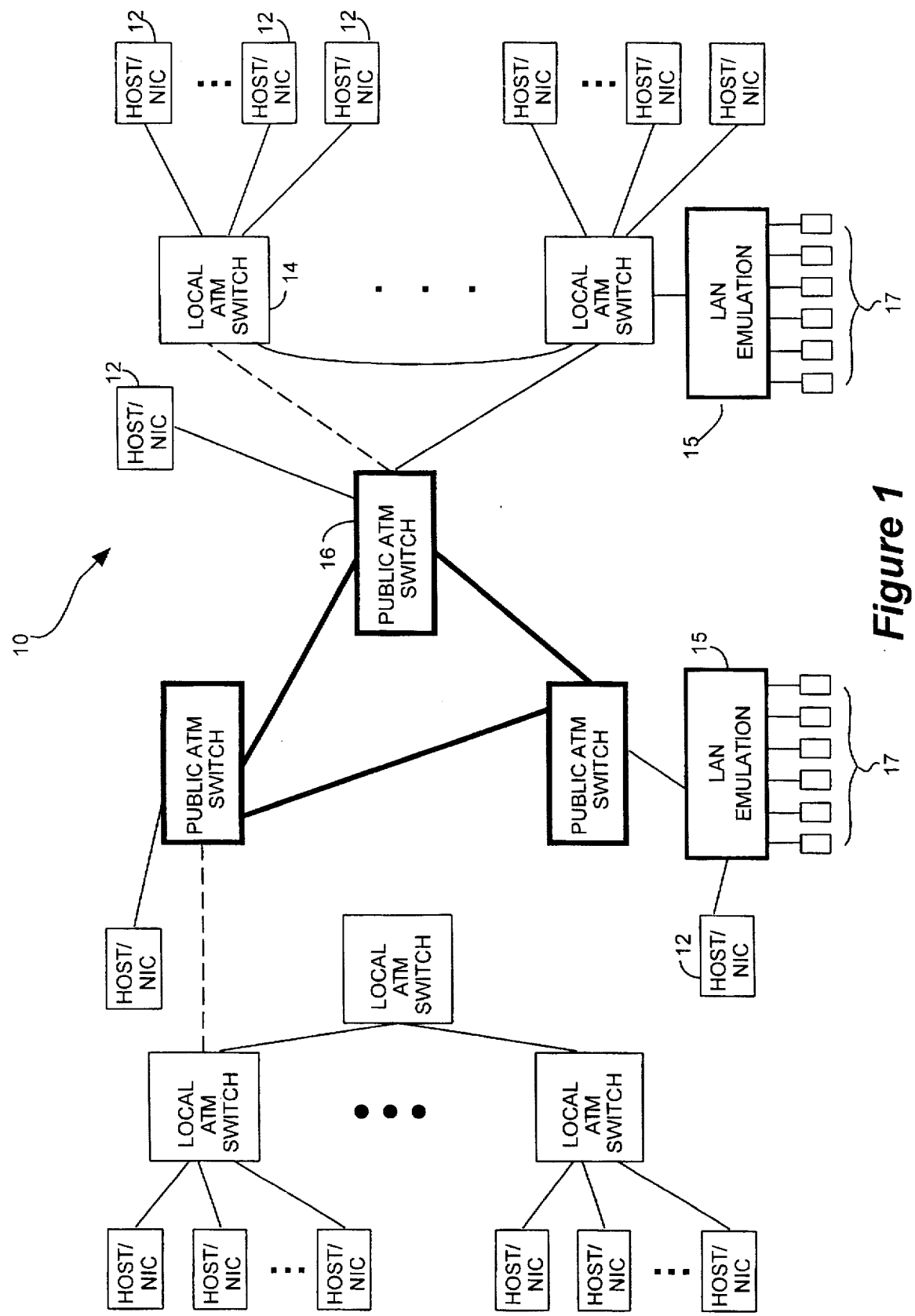
FIG. 1 illustrates an exemplary network of computer systems incorporating the of the present invention.

FIG. 1 illustrates an exemplary computer system network incorporating the ATM NIC of the present invention. Computer system network 10 includes host computer systems (not shown) which incorporate one or more ATM NIC 12. NICs 12 are coupled through local ATM switches 14 to public ATM switches 16 to enable asynchronous transfer of data between host computer systems coupled to network 10. Alternatively, NICs 12 can be coupled directly to public ATM switches 16. As shown in FIG. 1, computer system network 10 may also include computer systems which incorporate the use of a Local Area Network (LAN) emulation 15, which serves as a gateway for connecting other networks such as Ethernet or token ring networks 17 which utilize the ATM network as a supporting framework.

Figure 2:
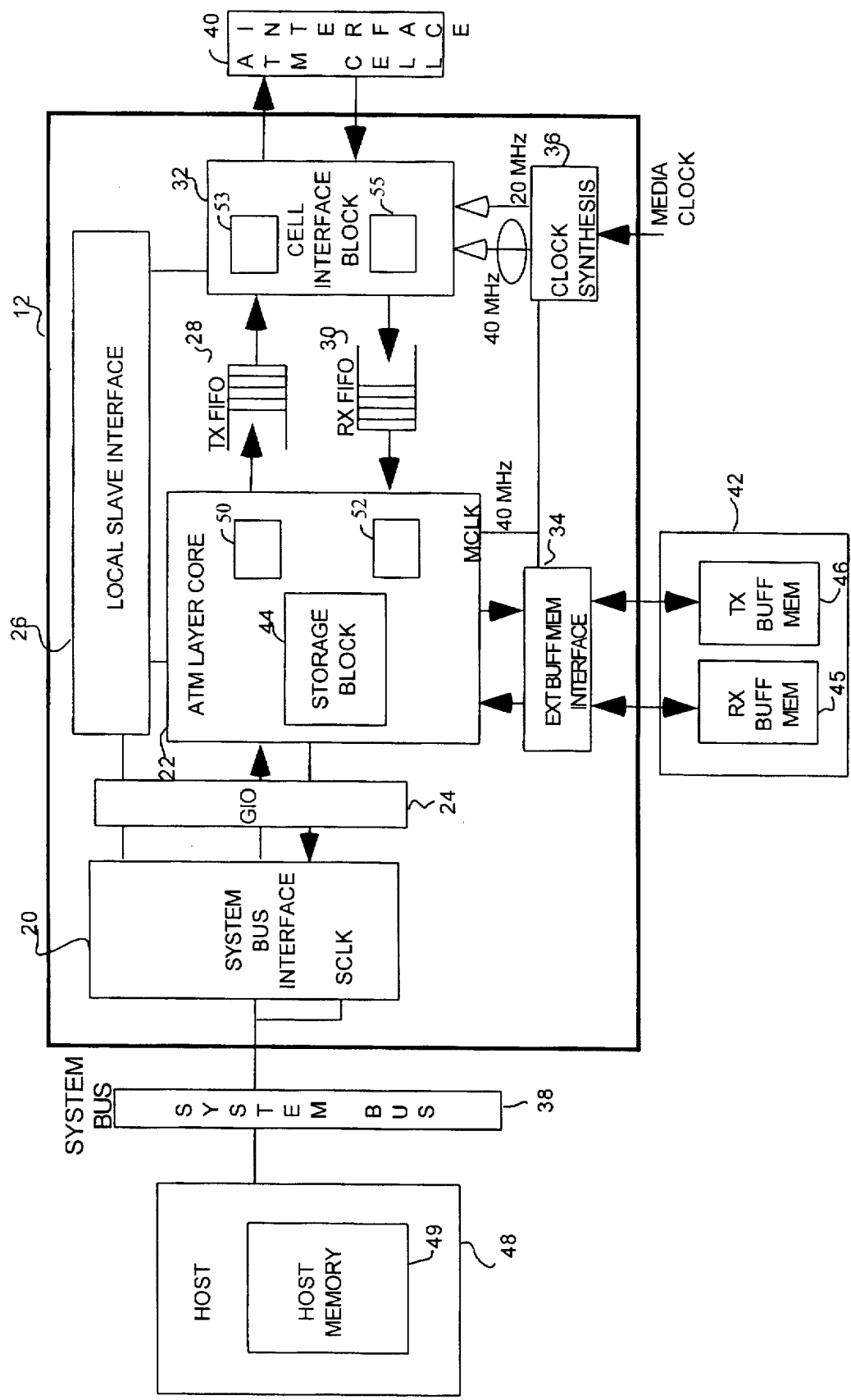
FIG. 2 illustrates one embodiment of the NIC of FIG. 1.

FIG. 2 is a simplified system diagram illustrating the architecture of ATM NIC 12 in accordance with a preferred embodiment of the present invention. ATM NIC 12 interfaces host computer system 48 coupled through system bus 38 to network ATM cell interface 40 operating in accordance with the ATM protocol.

ATM NIC 12 shown includes System Bus interface 20, Generic Input/Output (GIO) interface 24, System and ATM Layer Core 22, Local Slave interface 26, transmit (TX) FIFO 28, receive (RX) FIFO 30, Cell Interface Block 32, External Buffer Memory interface 34 and clock synthesis circuit 36.

Together, elements 20-36 of NIC 12 cooperate to transfer data between host computer 48 and the other computers in the network through multiple, dynamically allocated channels in multiple bandwidth groups. Collectively, the elements of NIC 12 function as a multi-channel intelligent direct of memory access (DMA) controller coupled to System Bus 38 of host computer system 48. In a preferred embodiment, multiple transmit and receive channels function as virtual connections utilizing a full duplex 155/622 Mbps physical link. Multiple packets of data, subscribed to different channels over System Bus 38 to external buffer memory 42, via External Buffer Memory interface 34, are segmented by System and ATM Layer Core 22 into transmit cells for transmission to ATM cell interface 40 through Cell Interface Block 32. Core 22 includes reassembly logic to facilitate reassembly of the received cells to packets.

4

Three memory sub-systems are associated with the operation of the NIC 12. These include host memory 49 located in host computer system 48, external buffer memory 42 external to NIC 12 and storage block 44 located in the Core 22. NIC 12 manages two memory areas: external buffer memory 42 and storage block 44. External buffer memory 42 contains packet data for all transmit and receive channels supported by NIC 12. Storage block 44 contains DMA state information for transmit and receive channels and pointers to data structures in host memory 49 for which DMA transfers are performed. Storage block 44 also contains the data structure specifics to manage multiple transmit and receive buffers for packets in transition between host 48 and ATM Cell Interface 40.

Host computer system 48 includes host memory 49 which contains data packets and pointers to the packets being transmitted and received. As noted previously, NIC 12 also shields the cell delineation details of asynchronous transfer from the applications on host computer system 48. For present purposes, it is assumed that software running on host computer system 48 transmits and receive data using wrap around transmit and receive rings with packet interfaces as is well known in the art.

TX and RX FIFOS 28, 30, coupled between Core 22, and Cell Interface Block 32, are used to stage the transmit and receive cell payloads of the transmit and receive packets respectively. The Cell Interface Block 32 transmits and receives cells to the ATM Cell Interface 40 of the network, driven by clock signals provided by Clock Synthesis Circuit 36. Preferably, ATM Cell Interface 40, and therefore ATM Cell Interface 32, conforms to the Universal Test and Operations Physical Interface for ATM (UTOPIA) standard, as described by the ATM Forum Ad Hoc specification. To conform to the UTOPIA specification, the clock synthesis circuit 36 provides either a clock signal of 20-25 MHz or 40-50 MHz to enable Cell Interface Block 32 to support an 8-bit stream of 20-25 MHz for 155 Mbps or a 16-bit stream at 40-50 MHz for a 622 Mbps data stream.

In the presently preferred embodiment, Cell Interface Block 32 receives 52 byte data cells each having a 4 byte cell header and a 48 byte payload from TX buffer memory 46 through TX FIFO 28 under the control of Core 22, in groups of 4 bytes. Cell Interface Block 32 inserts a checksum as a fifth byte to the cell header into each cell prior to providing the 53 byte data cell to ATM Cell Interface 40 at either 155 or 622 Mbps. Conversely, when Cell Interface Block 32 receives cells from ATM Cell Interface 40, it examines the checksum in the fifth byte of each cell to determine if the checksum is correct. If so, the byte representing the checksum is stripped from the cell and the cell is forwarded to RX FIFO 30 4 bytes at a time at of either 155 or 622 Mbps. Otherwise, the entire cell is dropped. Transferred bytes are stored in RX buffer memory 45 via external Buffer Memory Interface 34 under the control of Core 22.

In one embodiment, TX and RX FIFOS 28 and 30 are 33 bits wide, of which 32 bits are used for transmitting data and 1 bit is used as a tag. The tag bit is used to differentiate the 4-byte cell header from the 48-byte cell payload. The tag bit is generated by TX block 50 located within Core 22. In one embodiment, the tag bit is set to 1 to indicate the start of a cell header and the tag bit is reset to 0 to indicate a cell payload. Thus, the tag bit is 1 for the first 4 bytes of the cell (header) and then the tag bit is 0 for the remaining 48 bytes of the cell (cell payload).

Upon receiving the data cells from TX FIFO 28, TX circuit 53 located within Cell Interface block 32 examines the tag bit. If the tag bit is a 1, TX circuit 53 decodes the corresponding 32 bits as the header of the cell. If the tag bit is 0, TX circuit 53 decodes the corresponding 32 bits as data. Conversely, when Cell Interface block 32 receives data cells from ATM Cell Interface 40, RX block 55 in Cell Interface block 32 generates a tag bit to differentiate the 4-byte cell header from the 48-byte cell payload. Cell Interface block 32 then dispatches the data cells in groups of 4 bytes to RX FIFO 30. Upon receipt of the cell data from RX FIFO 30, RX circuit 52 in the Core 22 decodes the cell data in accordance with the value of the tag bit as discussed above.

Two synchronous clock signals, a 20 MHz signal and a 40 MHz signal, are provided to Cell Interface block 32 from the ATM Cell Interface Clock via the Clock Synthesis circuit 36. A 40 MHz clock is supplied to provide a 16-bit data stream at 40 MHz for 622 Mbps in accordance with the specifications of UTOPIA. A divide by 2 of the 40 MHz clock signal is performed in the Clock Synthesis circuit 36 to provide an 8-bit data stream at 20 MHz for 155 Mbps in accordance with the specifications of UTOPIA. The 40 MHz clock signal is also provided to the external buffer memory interface 34 for providing a 1.2 Gbps transmission rate. In addition, GIO 24 uses the 40 MHz clock signal for transmitting and receiving data.

TX Buffer Memory 46 provides 32 bits of data to the TX FIFO 28 and RX Buffer Memory 45 reads 32 bits of data from RX FIFO 30 at every cycle of the 40 MHz clock signal. However, ATM Cell Interface 40 reads 4 bytes of data from TX FIFO 28 every two clock cycles when operating at 622 Mbps, and reads 4 bytes of data from TX FIFO 28 every 8 clock cycles when operating at 155 Mbps. In the same manner, Cell Interface block 32 provides 4 bytes of data to TX FIFO 28 every two clock cycles when operating at 622 Mbps, and provides 4 bytes of data to TX FIFO 28 every 8 clock cycles when operating at 155 Mbps. Although the cell burst rate of Core 22 is different from the cell burst rate of Cell Interface block 32, the data rate between TX FIFO 28 and Cell Interface block 32 is, on average, the same as the data rate between the between TX FIFO 28 and Core 22. Similarly, the data rate between RX FIFO 30 and Cell Interface block 32 is on average, the same as the date rate between the RX FIFO 28 and Core 22. This is because the data rate between TX and RX FIFOS 28 and 30 and Core 22 is dependent the rate that data is read or written by Cell Interface block 32 respectively. In one embodiment, the depth of TX FIFO 28 is 18 words or 1½ cells long and the depth of RX FIFO 30 is 70 words long.

System Bus Interface 20 and GIO interface 24 insulate host computer system 48 from the specifics of the transfer to ATM Cell Interface 40. Furthermore, Core 22 is insulated from the specifics of system bus 38 and host specifics. In the presently preferred embodiment, the system bus is an S-Bus, as specified in the Institute of Electronics and Electrical Engineers (IEEE) standard 1496 specification. System Bus interface 20 is configured to communicate in accordance with the specifications of the system bus, in the present illustration, the S-Bus. It is contemplated that System Bus Interface 20 can be configured to conform to different host computer system busses. System Bus interface 20 is also configured to transfer and receive data in accordance with the protocols specified by GIO interface 24. GIO interface 24 provides a singular interface through which Core 22 communicates with the host computer. Thus, Core 22 does not change for different embodiments of NIC 12 which interface to different host computer systems and busses.

Figure 3:
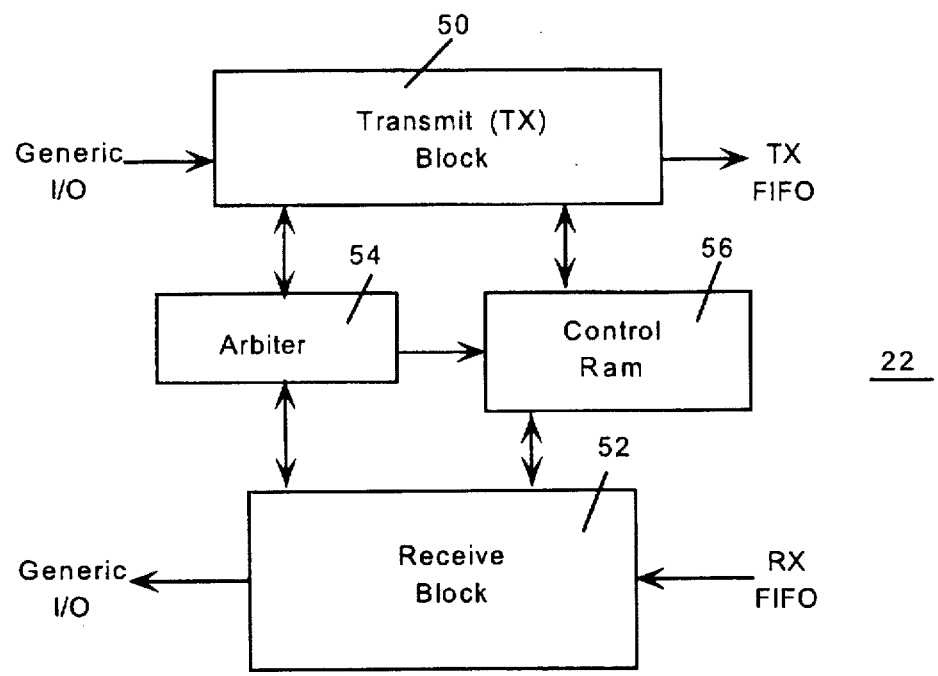
FIG. 3 illustrates the system and ATM layer core of FIG. 2.

FIG. 3 illustrates Core 22 in further detail. As shown, Core 22 comprises TX block 50, RX block 52, arbiter 54 and control memory 56 coupled to each other as shown. TX block 50 is used to receive ATM packets from the host computer system, segment them into ATM cells and provide the segmented ATM cells to TX FIFO 28. In the presently preferred embodiment, TX block 50 incorporates teachings of copending U.S. patent application, application Ser. No. 08/549,538, allowing TX block 50 to segment ATM packets at 622 Mbps or higher. RX block 52 is used to receive ATM cells from RX FIFO 30, reassemble them into ATM packets and provide the reassembled ATM packets to the host computer system. RX block 52 incorporates the teachings disclosed in the above identified copending US Patent Application for reordering the interleaved ATM cells for the different channels. In other words, received ATM cells for various channels are stored in ATM buckets in external memory 42. The ATM buckets are organized into linked lists on a per channel basis. The unused or empty ATM buckets are organized into a free resource linked list. Furthermore, as will be described in more detail below, RX block 52 incorporates the teachings of the present invention for burst transferring buffered ATM cells to the host computer system in a block manner, where the transfer blocks are not necessarily aligned with ATM cell boundaries, and at the same time, distinguishing ATM packet headers and data, except for a number of predetermined exceptions, i.e. the short packets and the atypical packets described earlier.

Control RAM 56 is used to store various control information for TX and RX blocks 50 and 52 including in particular, the linkage information for the above described ATM bucket linked lists, the relevant control pointers for unloading the ATM cells in the desired manner, and at least one control counter to be described more fully below. Lastly, arbiter 54 is used to arbitrate accesses to control RAM 56 between TX and RX blocks 50 and 52. Control RAM 56 and arbiter 54 may be implemented in a number of manners well known in the art.

FIG. 4 illustrates one embodiment of RX block 52 in further detail. As shown, for the illustrated embodiment, RX block 52 comprises RX Load block 58, RX Unload block 60, schedule queue 62, free list manager 64, external RAM interface 66, and control RAM interface 68, coupled to each other as shown. RX Load block 58 is used to receive the interleaved ATM cells from RX FIFO 30, and stored them in free ATM buckets in external memory 42. Free list manager 64 is used to manage the free resources, informing RX Load block 58 where the free buckets are located. RX Load block 58 is also used to schedule channels requiring unload services with schedule queue 62. In one embodiment, unload service is scheduled whenever the number of ATM cells accumulated for a channel reaches a predetermined threshold. RX Unload block 60 is used to unload the buffered ATM cells, and burst transfer them to the host computer system in the desired manner, i.e. in fixed size block where the block size is complementary to the bus interface, and yet at the same time distinguishing ATM packet header and data, except for the enumerated predetermined exceptions. For further description on the fundamental operations of RX Load block 58, RX Unload block 60, schedule queue 62 and free list manager 64, see copending U.S. patent application, Ser. No. 08/473,514.

External and Control RAM interfaces 66 and 68 perform their conventional interfacing functions to the respective memories. External and Control RAM interfaces 66 and 68 may also be implemented in any number of approaches well known in the art.

Before describing RX Unload block 60 in further detail, we will first describe the desired manner of transfer, referencing FIGS. 5–8. FIG. 5 illustrates a "typical" ATM packet 70 comprising a header 72, data 74 and EOP 76. As shown, ATM packet 70 is received in multiple ATM cells (packaged with cell headers) 78. Furthermore, the ATM cells of different channels arrived interleavingly. In other words, ATM cells 78 of ATM packet 70 are not necessarily received into RX FIFO 30 successively. As described earlier, however, some packets are relatively short, i.e., header 72 is relatively lengthy and data 74 is only a few bytes long. Furthermore, there are also atypical packets, wherein the entire packet is shorter than the header of the most common packet type.

FIG. 6 illustrate the desired manner packet headers and packet data are placed into the host computer system, i.e. the packet header is placed into header buffer 80, and the packet data are placed into data buffer 82, which is separate from header buffer 80, except for the short and atypical packets. For these packets, both the packet header and packet data are to be placed into header buffer 80.

FIGS. 7–8 illustrate the desired manner of transferring ATM header 72 and ATM data 74 to their respective buffers 80 and 82. As shown, ATM cells 78 stored in the ATM buckets. The ATM buckets are linked together as linked lists on a per channel basis (linkage information not shown). Additionally, each linked list is managed with a number of pointers. More specifically, each linked list is managed with a first bucket pointer 84 pointing to the first full bucket (as opposed to a partial buckets or a bucket with residual data), a next bucket pointer 86 pointing to the next ATM bucket immediately following the first bucket, and a last bucket pointer 88 pointing to the last ATM bucket.

Stored ATM cells are transferred to the host computer system in fixed sized blocks, where the block size is complementary to the bus interface and not equal to the ATM cell size. Thus, it is possible for partially unloaded bucket or bucket with residual data to exist from time to time. (Note that there is only one partial bucket at a time for each channel.) Therefore, in addition to the above described pointers 84–88, a partial bucket pointer 90 is also employed for each channel to identify the partial bucket, and a partial offset 92 is used to identify the starting location of the residual data within the partial bucket. Furthermore, until the header is completely transferred, it is necessary to maintain the remaining header length, thus remaining header length counter 94 is employed for that purpose.

Control pointers 84–92 and control counter 94 are updated after each burst transfer. More specifically, first pointer 84, next pointer 86, partial pointer 92 and partial offset 94 are all "advanced" accordingly, and remaining header length 94 are decremented accordingly. Last bucket pointer 88 is updated when all buffered ATM cells for the channel have been transferred to the host computer system.

Since partial offset is used to denote the starting location of the residual data in a partial ATM bucket, this partial offset can take on values that are between 0 and the ATM cell size (CS) only. Partial offset is equal to 0 when there is no partial bucket. On the other hand partial offset is equal to CS if it is pointing to the end of the ATM bucket. Thus, to determine the correct new partial offset after each burst transfer, upon nominally incrementing the partial offset by the burst size (BS), it must be adjusted or normalized so that the partial offset value falls between 0 and CS.

Additionally, since CS and the BS are fixed, the values incremented partial offset can take on prior to normalization are finite and predeterminable. For example, in the presently preferred embodiment, CS is 48 bytes, and BS is 64 bytes. Thus, the incremented partial offset value prior to normalization is necessarily between 0 and 28 (in units of words). As a further illustration, if BS is changed to 128 bytes, the incremented partial offset value prior to normalization is necessarily between 0 and 44 (in units of words).

Furthermore, for the purpose of managing the bucket pointers and the partial offset, the pre-normalization incremented partial offset value (p) can be analyzed as a finite number of predeterminable cases. Consider the presently preferred embodiment again (CS=48 bytes and BS=64 bytes), since p is necessarily between 0–28 (in units of words), the stopping location of the just completed burst transfer is beyond the "furthest full ATM bucket" if p is greater than 24, within the "furthest full ATM bucket"[2] if p is between 13–24, and within the "starting bucket" when p is between 0–12. As a further illustration, for the embodiment where CS is 48 bytes and BS is 128 bytes, since p is necessarily between 0–44 (in units of words), the stopping location of the just completed burst transfer is beyond the "furthest full ATM bucket" if p is greater than 36, within the "furthest full ATM bucket" if p is between 25–36, within the bucket immediately following the "starting bucket" if p is between 13–24, and within the "starting bucket" when p is between 0–12.

[2] The "furthest full ATM bucket" in this case is the bucket immediately following the "starting bucket".

Having now described the desired manner of transfer, we will now describe RX Unload block 60 in further detail, in particular, the teachings of the present invention incorporated therein, referencing FIGS. 9 and 10a–10f. FIG. 9 illustrates one embodiment of RX Unload block 60. As shown, RX Unload block 60 comprises data engine state machine 96, lookahead state machine 98, a get buffer state machine 100, a number of unload registers 102 and a number of adders, subtractors, comparators and multiplexors 104, coupled to each other as shown. Get buffer state machine 100 is used to get buffers on the host computer system, whereas data engine state machine 96 is used to actually burst transfer the header and data to the appropriate buffers on the host computer system. Lookahead state machine 98 is used to control the operation of RX unload block 60. Unload registers 102 are used by the various state machines 96–100, in particular, by lookahead state machine 98, for storing various control data. Modifications to the control data are accomplished by reading the control data out of unload registers 102, providing the read out data to selected ones of the adders, subtractors, etc. 104, and then operating on the provided control data using selected ones of the adders, subtractors etc. 104.

Lookahead state machine 98 provides the appropriate control information and control signals to get buffer state machine 100 and data engine state machine 96, including the above described first bucket pointer 84, next bucket pointer 86, etc. Lookahead state machine 98 monitors the unloading being performed, including whether it is header burst transfer or data burst transfer that is being performed and whether an EOP was detected among the header/data that was just burst transferred. In turn, lookahead state machine 98 maintains the control data accordingly, using unload registers 102 and the adders, subtractors etc. 104.

The manner in which lookahead state machine 98 causes the relevant control pointers 84–92 and the at least one relevant counter 94 to be properly maintained, thereby allowing the ATM cells to be burst transferred to the host computer system in the desired manner, will be described in more detail below. The other functions performed by get buffer state machine 100, data engine state machine 96, as well as lookahead state machine 98, are not directly relevant with respect to understanding the present invention. Thus, they will not be further described.

Figure 10A:
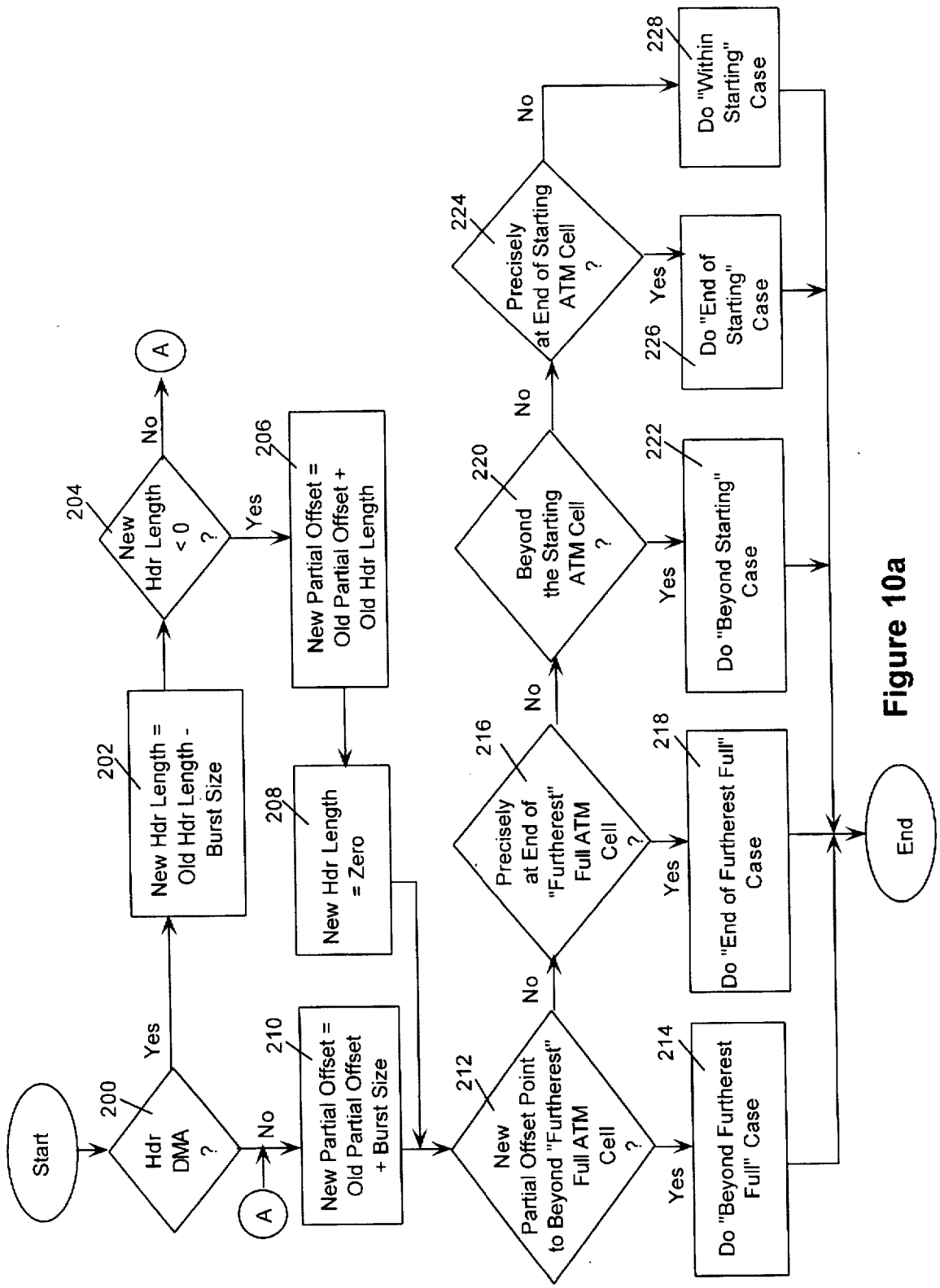

FIGS. 10a–10f illustrate one embodiment of the operational logic of lookahead state machine 98 for maintaining the various relevant control pointers 84–92 and the remaining header length counter 94. As shown in FIG. 10a, lookahead state machine 98 first determines if the burst transfer is a header burst transfer or a data burst transfer, step 200. If the burst transfer is determined to be a header burst transfer, lookahead state machine 98 causes a new remaining header length to be computed by subtracting the burst size from the old remaining header length, step 202. Next, lookahead state machine 98 determines if the new header length is less than zero, step 204. If new header length is determined to be less than zero, lookahead state machine 98 causes new partial offset (unnormalized) 92 to be computed, by adding the old header length 94 to the old partial offset 92, step 206. Furthermore, lookahead state machine 98 causes the new header length 92 to be adjusted to zero, step 208.

On the other hand, if it was determined at step 200 that the burst transfer is a data burst transfer, or at step 204 that the new header length 92 is not less than zero, lookahead state machine 98 simply causes a new partial offset 92 to be computed by adding the burst size to the old partial offset 92, step 210.

Next, lookahead state machine 98 determines if the prenormalization new partial offset 92 is pointing at a location beyond the "furthest full ATM bucket", step 212. If the determination is positive, lookahead state machine 98 causes the relevant pointers 84–92 to be updated in accordance to the "beyond furthest full ATM bucket" case, step 214. On the other hand, if the determination is negative, lookahead state machine 98 further determines if the prenormalization new partial offset is pointing precisely at the end of the "furthest full ATM bucket", step 216.

If the determination at step 216 is positive, lookahead state machine 98 causes the relevant pointers 84–92 to be updated in accordance to the "end of furthest full ATM bucket" case, step 218. On the other hand, if the determination at step 216 is negative, lookahead state machine 98 further determines if the prenormalization new partial offset is pointing beyond the "starting bucket", step 220.

Again, if the determination at step 220 is positive, lookahead state machine 98 causes the relevant pointers 84–92 to be updated in accordance to the "beyond the starting bucket" case, step 222. On the other hand, if the determination at step 220 is negative, lookahead state machine 98 further determines if the prenormalization new partial offset is pointing precisely at the end of the "starting to bucket", step 224.

Likewise, if the determination at step 224 is positive, lookahead state machine 98 causes the relevant pointers 84–92 to be updated in accordance to the "end of starting bucket" case, step 226. On the other hand, if the determination at step 224 is negative, lookahead state machine 98 causes the relevant pointers 84–92 to be updated in accordance to the "within starting bucket" case, step 228.

FIGS. 10b–10f illustrate how the relevant pointers 84–92 are updated under the above described cases. For ease of explanation, the updates will be illustrated in accordance to the presently preferred embodiment where CS is 48 bytes and BS is 64 bytes. In other words, under the presently preferred embodiment, as described earlier, the valid values (in units of words) partial offset 92 can take on are 0–12. The largest value (in units of words) partial offset 92 can take on before a burst transfer is 12, and the largest value (in units of words) prenormalization new partial offset 92 can take on is 28 (12+16, where 16 is BS in words). Therefore, for this embodiment, the appropriate adjustment values (in units of words) for normalizing the partial offset 92, are 24 (or 2×CS) for the cases "beyond" and "at the end" of the "furthest full ATM bucket", and 12 (1×CS) for the cases "beyond" and "at the end" of the "starting bucket" cases.

Figure 10C:
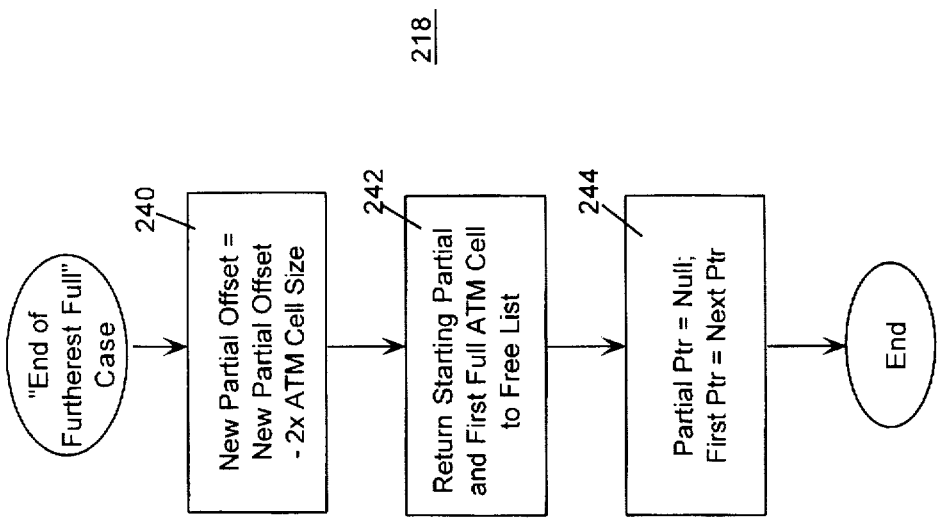
Figure 10B:
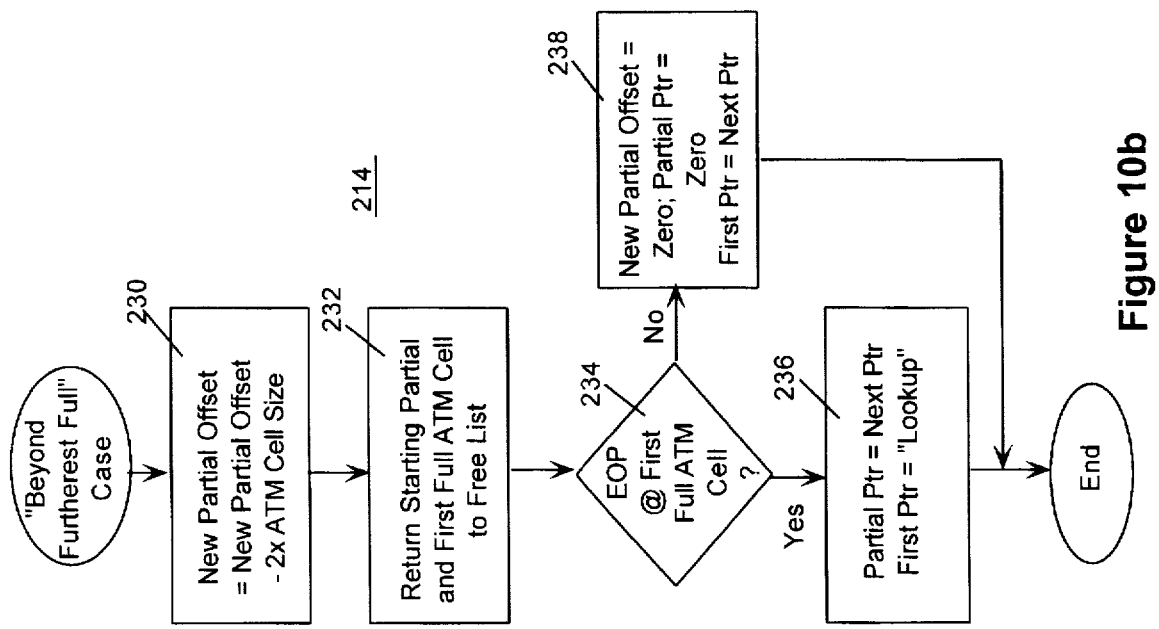

Thus, as shown in FIG. 10b, for the "beyond furthest full ATM bucket" case, at step 230, lookahead state machine 98 causes the normalized new partial offset 92 to be computed by subtracting 2×CS from the prenormalization new partial offset 92. Then, lookahead state machine 98 causes the former partial bucket and the former first bucket to be returned to the free resource list, step 232. Next, lookahead state machine 98 determines if EOP was detected in the previous first full ATM bucket, i.e. the bucket pointed to by the first bucket pointer prior to the just completed burst transfer, step 234. If the determination is positive, lookahead state machine 98 would set the partial bucket pointer 90 to be equal to the previous next bucket pointer 86, and look up the appropriate address value for new first bucket pointer 84 using the linkage information maintained. On the other hand, if the determination is negative, lookahead state machine 98 sets new partial bucket pointer 90 to null, normalized new partial offset 92 to zero, and the first bucket pointer 84 to equal to the previous next bucket pointer 86, step 238.

As shown in FIG. 10c, for the "at the end of the furthest full ATM bucket" case, at step 240, lookahead state machine 98 causes the normalized new partial offset 92 to be computed by subtracting 2×CS from the prenormalization new partial offset pointer 92. Then, lookahead state machine 98 causes the former partial bucket and the first bucket to be returned to the free resource list, step 242. Furthermore, lookahead state machine 98 sets new partial bucket pointer 90 to null, and the first bucket pointer 84 to equal to the previous next bucket pointer 86, step 244. (Note that the partial offset 92 was effectively set to zero at step 240.)

Figure 10D:
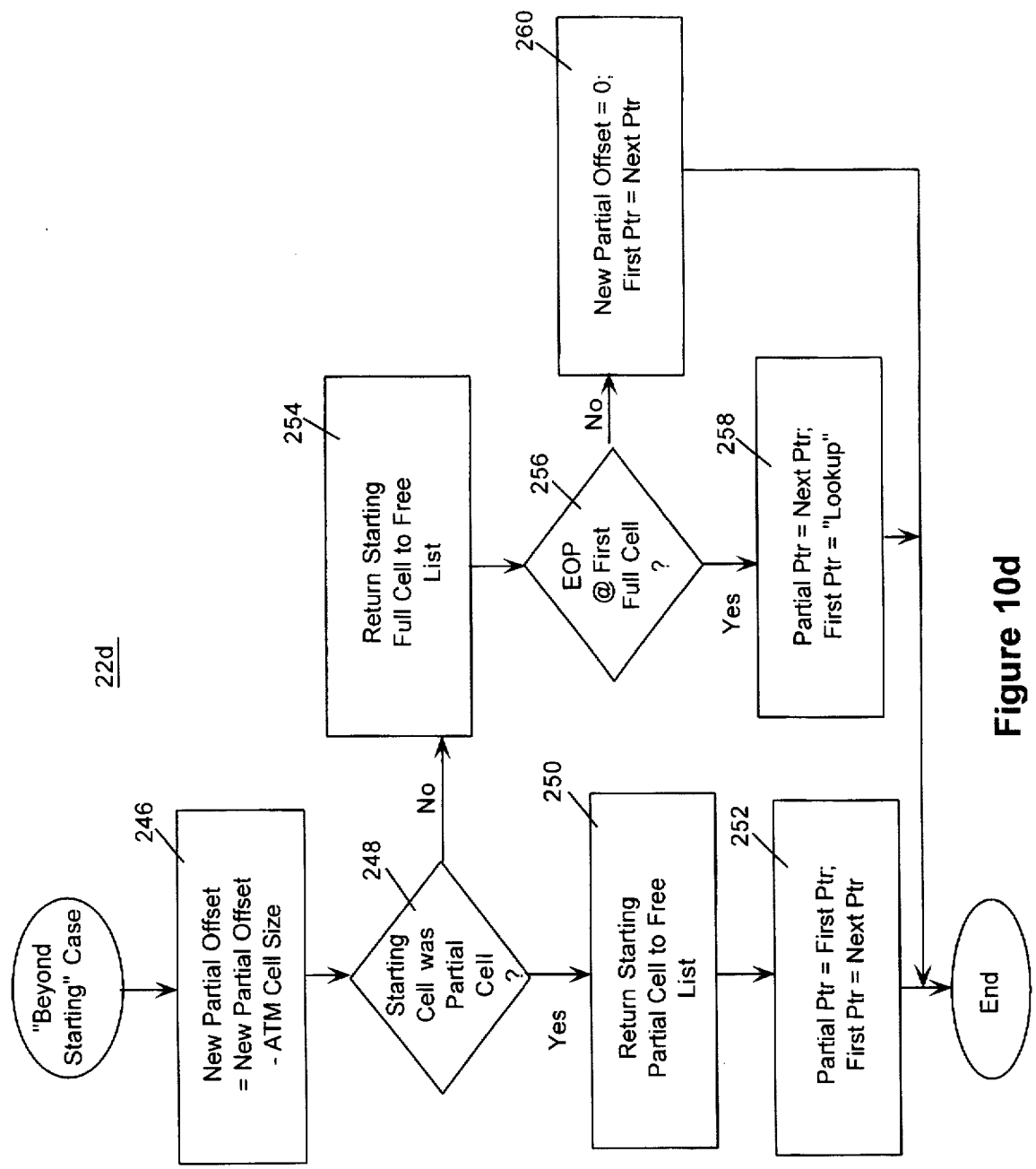

As shown in FIG. 10d, for the "beyond starting ATM bucket" case, at step 246, lookahead state machine 98 causes the normalized new partial offset 92 to be computed by subtracting 1×CS from the prenormalization new partial offset 92. Then, lookahead state machine 98 determines if the "starting bucket" was a partial bucket, step 248. If the "starting bucket" was a partial bucket, lookahead state machine 98 causes the "starting partial bucket" to be returned to the free list, step 250. Then, lookahead state machine 98 sets the partial bucket pointer 90 to equal to the previous first bucket pointer 84, and the first bucket pointer 84 to equal the previous next bucket pointer 86.

However, if it was determined back at step 248, that the "starting bucket" was not a partial bucket, lookahead state machine 98 causes the "starting bucket" to be returned to the free list, step 254. Next, lookahead state machine 98 determines if EOP was detected at the former first bucket, step 256. If the determination is positive, lookahead state machine 98 sets partial pointer 90 equal to previous next pointer 86, and looks up the address value for new first pointer 84 using the linkage information maintained. On the other hand, if the determination is negative, lookahead state machine 98 sets partial offset 92 to zero, and set first pointer 84 to equal to previous next pointer 86, step 260.

Figure 10F:
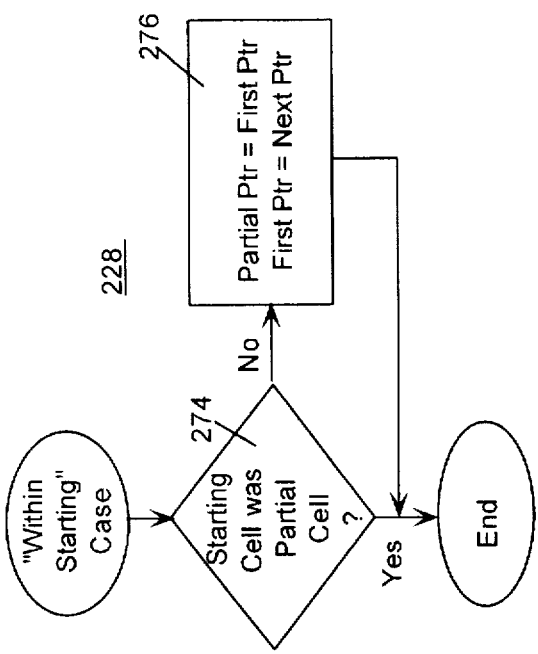
Figure 10E:
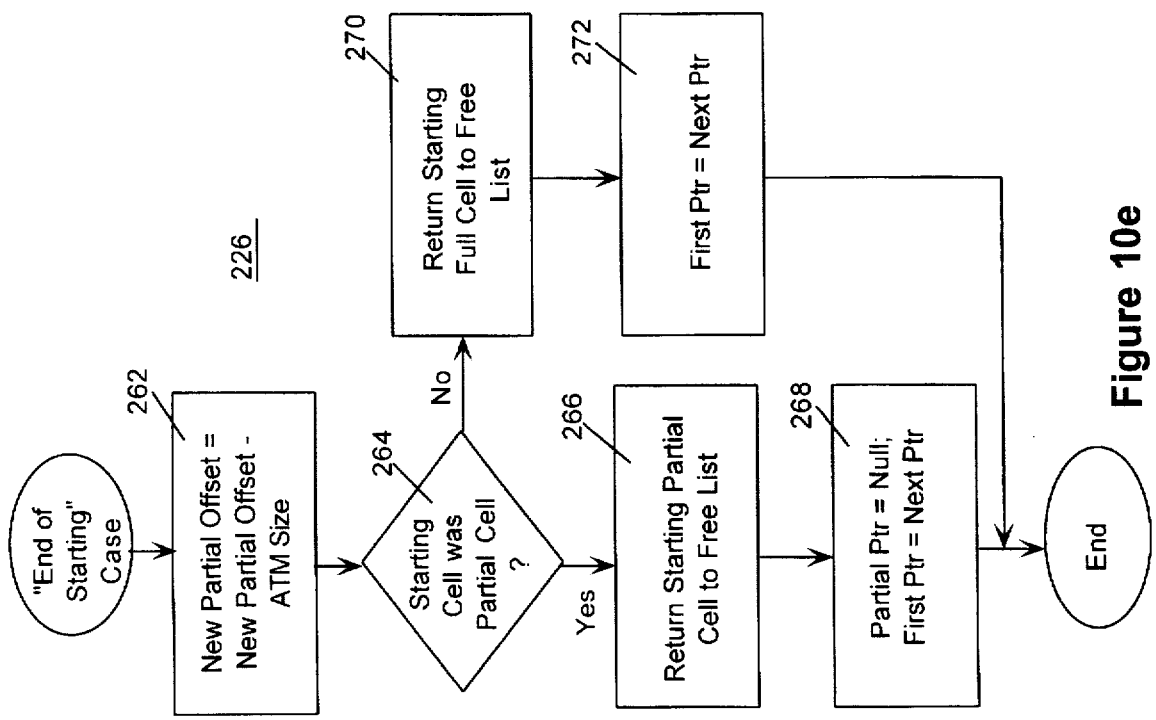

As shown in FIG. 10e, for the "at the end of starting ATM bucket" case, at step 262, lookahead state machine 98 causes the normalized new partial offset 92 to be computed by subtracting 1×CS from the prenormalization new partial offset 92. Then, lookahead state machine 98 determines if the "starting bucket" was a partial bucket, step 264. If the "starting bucket" was a partial bucket, lookahead state machine 98 causes the "starting partial bucket" to be returned to the free list, step 266. Then, lookahead state machine 98 sets the partial bucket pointer 90 to equal to zero, and the first bucket pointer 84 to equal the previous next bucket pointer 86. On the other hand, if back at step 264, it was determined lookahead state machine 98 causes the starting first bucket to be returned to the free list, step 270. Then, lookahead state machine 98 sets the first bucket pointer 84 to equal the previous next bucket pointer 86.

Lastly, as shown in FIG. 10f, for the "within starting bucket" case, lookahead state machine 98 determines if the "starting bucket" was a partial bucket, step 274. If the determination is positive, no further action is taken, i.e. all pointers as well as the partial offset are to remain unchanged. On the other hand, if the determination was negative, lookahead state machine 98 sets the partial bucket pointer 90 to equal to the previous first pointer 84, and the first pointer to equal the previous next pointer 86, step 276.

Thus, a method and apparatus for burst transferring ATM packet header and data to a host computer system has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
    (a) a memory unit for storing a plurality of control data for a plurality of linked storage buckets for storing a plurality of asynchronous transfer mode (ATM) cells of a plurality of packets for a plurality of channels, each packet having a packet header and packet data; and
    (b) a receive block coupled to the memory unit for managing receipt of the ATM cells into the linked storage buckets, and burst transferring the packet headers and the packet data out of the linked storage buckets into separate header and data buffers of the various channels on a host computer system coupled to the apparatus through an interface bus, except for a number of predetermined exceptions under which both packet header and data are burst transferred into the header buffers, the packet headers and data being burst transferred in fixed size blocks, each block having a block size that is complementary to the interface bus, but not necessarily aligned with cell boundaries, the receive block comprising logic for maintaining the control data, taking into account whether each burst transfer is a header burst transfer or a data burst transfer, if the burst transfer is a header burst transfer, whether the entire packet header has been completely transferred at the end of the particular burst transfer, and additionally, whether the packet is to be handled exceptionally.

2. The apparatus as set forth in claim 1, wherein the logic is disposed in an unload block of the receive block, the unload block comprising
    (b.1) a plurality of registers for storing a working copy of the control data of a channel whose packet header or data is being burst transferred to the host computer system,
    (b.2) a plurality of operation circuitry coupled to the registers for selectively performing numerical and logic operations on selected ones of the control data; and
    (b.3) a state machine coupled to the operation circuitry and the registers for controlling the selective performance of the numerical and logical operations on selected ones of the control data to effectuate maintenance of the control data, taking into account whether each burst transfer is a header burst transfer or a data burst transfer, if the burst transfer is a header burst transfer, whether the entire packet header has been completely transferred at the end of the particular burst transfer, and additionally, whether the packet is to be handled exceptionally.

3. The apparatus as set forth in claim 1, wherein
    the control data include for each channel a counter for tracking the length of the header remains to be burst transferred for the packet being burst transferred;
    for each burst transfer, the logic also uses the zero and non-zero states of the remaining header length counter to determine whether the burst transfer is a header burst transfer or a data burst transfer; and
    for each header burst transfer, the logic decrements the remaining header length counter by the block size, but not beyond zero.

4. The apparatus as set forth in claim 3, wherein
    the control data further include for each channel a normalized partial offset for identifying a location within a partially unloaded storage bucket of the channel where residual header/data starts, if the partially unloaded storage bucket exists; and
    for each burst transfer, the logic computes an unnormalized partial offset by incrementing the normalized partial offset by either the block size or the pre-burst transfer value of the remaining header length counter, depending on whether the burst transfer is a header burst transfer or a data burst transfer, and if it is a header burst transfer, further depending on whether the remaining header length counter has been decremented to zero.

5. The apparatus as set forth in claim 4, wherein,
    the logic logically divides potential values that could be assumed by the unnormalized partial offset after each burst transfer into a plurality of ranges, each range denoting a portion of the linked storage buckets; and
    for each burst transfer, the logic further determines which portion of the linked storage buckets the unnormalized partial offset is pointing to by determining which range numerically encompasses the unnormalized partial offset.

6. The apparatus as set forth in claim 5, wherein,
    the control data further include a partial bucket pointer for identifying the partially unloaded storage bucket for the channel, a first bucket pointer for identifying the first full storage bucket for the channel, and a next bucket pointer for identifying the storage bucket immediately following the first storage bucket for the channel;
    for each burst transfer, the logic further conditionally returns the partially unloaded storage bucket, the first full storage bucket and the next storage bucket, and maintaining the partial, first and next bucket pointers, depending on which portion of the linked storage buckets the unnormalized partial offset is pointing to.

7. The apparatus as set forth in claim 6, wherein, the portions of the linked storage buckets include
    a first portion that is beyond the storage bucket whose ATM cell is the furthest ATM cell that could have been completely burst transferred by the burst transfer; and
    a second portion that is precisely at the end of the storage bucket whose ATM cell is the furthest ATM cell that could have been completely burst transferred by the burst transfer.

8. The apparatus as set forth in claim 7, wherein, the portions of the linked storage buckets further include a third portion that is beyond the storage bucket where the just completed burst transfer started, but before the second portion.

9. The apparatus as set forth in claim 7, wherein, the portions of the linked storage buckets further include a third portion that is precisely at the end of the storage bucket where the just completed burst transfer started; and a fourth portion that is within the storage bucket where the just completed burst transfer started.

10. In a computer system, a method for burst transferring headers and data of packets from a network interface circuit of the system to buffers on the system, the method comprising the steps of:

(a) storing a plurality of control data for a plurality of linked storage buckets for storing a plurality of asynchronous transfer mode (ATM) cells of the packets on a per channel basis in a memory unit; and (b) managing receipt of the ATM cells into the linked storage buckets, and burst transferring the packet headers and the packet data out of the linked storage buckets into separate header and data buffers of the various channels through an interface bus, except for a number of predetermined exceptions under which both packet header and data are burst transferred into the header buffers, the packet headers and data being burst transferred in fixed size blocks, each block having a block size that is complementary to the interface bus, but not necessarily aligned with cell boundaries, and (c) maintaining the control data, taking into account whether each burst transfer is a header burst transfer or a data burst transfer, if the burst transfer is a header burst transfer, whether the entire packet header has been completely transferred at the end of the particular burst transfer, and additionally, whether the packet is to be handled exceptionally.

11. The method as set forth in claim 10, wherein the control data include for each channel a counter for tracking the length of the header remains to be burst transferred for the packet being burst transferred;

step (c) includes, for each burst transfer, using the zero and non-zero states of the remaining header length counter to determine whether the burst transfer is a header burst transfer or a data burst transfer; and step (c) further includes, for each header burst transfer, decrementing the remaining header length counter by the block size, but not beyond zero.

12. The method as set forth in claim 11, wherein the control data further include for each channel a normalized partial offset for identifying a location within a partially unloaded storage bucket of the channel where residual header/data starts, if the partially unloaded storage bucket exists; and step (c) includes, for each burst transfer, computing an unnormalized partial offset by incrementing the normalized partial offset by either the block size or the pre-burst transfer value of the remaining header length counter, depending on whether the burst transfer is a header burst transfer or a data burst transfer, and if it is a header burst transfer, further depending on whether the remaining header length counter has been decremented to zero.

13. The method as set forth in claim 12, wherein, step (c) further includes logically dividing potential values that could be assumed by the unnormalized partial offset after each burst transfer into a plurality of ranges, each range denoting a portion of the linked storage buckets; and step (c) further includes, for each burst transfer, determining which portion of the linked storage buckets the unnormalized partial offset is pointing to by determining which range numerically encompasses the unnormalized partial offset.

14. The method as set forth in claim 13, wherein, the control data further include a partial bucket pointer for identifying the partially unloaded storage bucket for the channel, a first bucket pointer for identifying the first full storage bucket for the channel, and a next bucket pointer for identifying the storage bucket immediately following the first storage bucket for the channel;

step (c) further includes, for each burst transfer, conditionally returning the partially unloaded storage bucket, the first full storage bucket and the next storage bucket, and maintaining the partial, first and next bucket pointers, depending on which portion of the linked storage buckets the unnormalized partial offset is pointing to.

15. The method as set forth in claim 14, wherein, the portions of the linked storage buckets include a first portion that is beyond the storage bucket whose ATM cell is the furthest ATM cell that could have been completely burst transferred by the burst transfer; and a second portion that is precisely at the end of the storage bucket whose ATM cell is the furthest ATM cell that could have been completely burst transferred by the burst transfer.

16. The method as set forth in claim 15, wherein, the portions of the linked storage buckets further include a third portion that is beyond the storage bucket where the just completed burst transfer started, but before the second portion.

17. The method as set forth in claim 16, wherein, the portions of the linked storage buckets further include a third portion that is precisely at the end of the storage bucket where the just completed burst transfer started; and a fourth portion that is within the storage bucket where the just completed burst transfer started.

18. A computer system comprising:

(a) a first memory unit for storing a plurality of header and data buffers for storing a plurality of headers and data for a plurality of packets for a plurality of channels;

(b) a second memory unit for storing a plurality of linked storage buckets for storing a plurality of asynchronous transfer mode (ATM) cells of the packets;

(c) a third memory unit for storing a plurality of control data for the linked storage buckets; and (d) a receive block coupled to the memory units for managing receipt of the ATM cells into the linked storage buckets, and burst transferring the headers and data of the packets out of the linked storage buckets into the header and data buffers through an interface bus coupling the first and second memory units, except for a number of predetermined exceptions under which both packet header and data are burst transferred into the header buffers, the packet headers and data being burst transferred in fixed size blocks, each block having a block size that is complementary to the interface bus, but not necessarily aligned with cell boundaries, the receive block comprising logic for maintaining the control data, taking into account whether each burst transfer is a header burst transfer or a data burst transfer, if the burst transfer is a header burst transfer, whether the entire packet header has been completely transferred at the end of the particular burst transfer, and additionally, whether the packet is to be handled exceptionally.

19. The computer system as set forth in claim 18, wherein the logic is disposed in an unload block of the receive block, the unload block comprising (d.1) a plurality of registers for storing a working copy of the control data of a channel whose packet header or data is being burst transferred to the host computer system, (d.2) a plurality of operation circuitry coupled to the registers for selectively performing numerical and logic operations on selected ones of the control data; and (d.3) a state machine coupled to the operation circuitry and the registers for controlling the selective performance of the numerical and logical operations on selected ones of the control data to effectuate maintenance of the control data, taking into account whether each burst transfer is a header burst transfer or a data burst transfer, if the burst transfer is a header burst transfer, whether the entire packet header has been completely transferred at the end of the particular burst transfer, and additionally, whether the packet is to be handled exceptionally.

20. The computer system as set forth in claim 18, wherein the control data include for each channel a counter for tracking the length of the header remains to be burst transferred for the packet being burst transferred;

for each burst transfer, the logic also uses the zero and non-zero states of the remaining header length counter to determine whether the burst transfer is a header burst transfer or a data burst transfer; and for each header burst transfer, the logic decrements the remaining header length counter by the block size, but not beyond zero.

21. The computer system as set forth in claim 20, wherein the control data further include for each channel a normalized partial offset for identifying a location within a partially unloaded storage bucket of the channel where residual header/data starts, if the partially unloaded storage bucket exists; and for each burst transfer, the logic computes an unnormalized partial offset by incrementing the normalized partial offset by either the block size or the pre-burst transfer value of the remaining header length counter, depending on whether the burst transfer is a header burst transfer or a data burst transfer, and if it is a header burst transfer, further depending on whether the remaining header length counter has been decremented to zero.

22. The computer system as set forth in claim 21, wherein, the logic logically divides potential values that could be assumed by the unnormalized partial offset after each burst transfer into a plurality of ranges, each range denoting a portion of the linked storage buckets;

for each burst transfer, the logic further determines which portion of the linked storage buckets the unnormalized partial offset is pointing to by determining which range numerically encompasses the unnormalized partial offset;

the control data further include a partial bucket pointer for identifying the partially unloaded storage bucket for the channel, a first bucket pointer for identifying the first full storage bucket for the channel, and a next bucket pointer for identifying the storage bucket immediately following the first storage bucket for the channel;

for each burst transfer, the logic further conditionally returns the partially unloaded storage bucket, the first full storage bucket and the next storage bucket, and maintaining the partial, first and next bucket pointers, depending on which portion of the linked storage buckets the unnormalized partial offset is pointing to.

* * * * *